US006799670B1

(12) United States Patent
Korecki

(10) Patent No.: US 6,799,670 B1
(45) Date of Patent: Oct. 5, 2004

(54) COIN VALIDATION

(75) Inventor: Nikola Korecki, Croydon Park (AU)

(73) Assignee: Microsystem Controls Pty Ltd, South Melbourne (AU)

( * ) Notice: Subject to any disclaimer, the term of this patent is extended or adjusted under 35 U.S.C. 154(b) by 46 days.

(21) Appl. No.: 10/019,925

(22) PCT Filed: Jul. 3, 2000

(86) PCT No.: PCT/AU00/00804

§ 371 (c)(1),
(2), (4) Date: Mar. 22, 2002

(87) PCT Pub. No.: WO01/03076

PCT Pub. Date: Jan. 11, 2001

(30) Foreign Application Priority Data

Jul. 2, 1999 (AU) .............................................. PQ1362

(51) Int. Cl.[7] .................................................. G06F 7/16
(52) U.S. Cl. ........................................................ 194/302
(58) Field of Search ................................. 194/302, 303, 194/308, 317; 382/136; 700/89, 223, 226; 702/57, 82

(56) References Cited

U.S. PATENT DOCUMENTS

| | | | | | |
|---|---|---|---|---|---|
| 5,469,529 | A | * | 11/1995 | Bimbot et al. | 704/246 |
| 5,503,262 | A | * | 4/1996 | Baudat et al. | 194/206 |
| 5,522,491 | A | * | 6/1996 | Baudat et al. | 194/207 |
| 5,568,854 | A | | 10/1996 | Hayes et al. | 194/318 |
| 5,583,951 | A | | 12/1996 | Sirat et al. | 382/232 |
| 5,710,833 | A | | 1/1998 | Moghaddam et al. | 382/228 |
| 5,812,992 | A | | 9/1998 | de Vries | 706/25 |
| 6,588,571 | B1 | * | 7/2003 | Baudat | 194/328 |
| 2002/0117375 | A1 | * | 8/2002 | Baudat et al. | 194/302 |

FOREIGN PATENT DOCUMENTS

| | | | |
|---|---|---|---|
| GB | 2 251 111 | 6/1992 | G07D/5/00 |
| JP | 8-212415 | 8/1996 | G07D/5/08 |
| WO | 92/07339 | 4/1992 | G07D/5/08 |
| WO | 92/18951 | 10/1992 | G07D/5/00 |
| WO | 94/12951 | 6/1994 | G07D/7/00 |

* cited by examiner

*Primary Examiner*—Donald P. Walsh
*Assistant Examiner*—Mark J Beauchaine
(74) *Attorney, Agent, or Firm*—Merchant & Gould, P.C.

(57) ABSTRACT

Coin validation can be advantageously improved by transforming measured data values associated with coin characteristics from a first geometric space to a second geometric space, in which the transformed values in the second geometric space are preferably better adapted for discrimination between different coin denominations than the corresponding values in the first geometric space. Preferably, principal component analysis is used to identify principal components that can be used as dimensions of the second geometric space, so that measured data values in the second geometric space are less correlated than in the first geometric space.

13 Claims, 3 Drawing Sheets

COIN VALIDATION

The invention relates to methods of validating coins, or similar tokens having associated monetary values.

BACKGROUND OF THE INVENTION

Coin-operated machines are widely used to provide goods and services to the public. These machines include, for example, amusement machines, vending machines, gaming machines and pay phones. For coin-operated machines of this type, a coin validator is typically used to determine which denomination of coin of a given currency is deposited in the machine. The coin validator usually also seeks to detect attempted fraud by distinguishing genuine coins from different coins (ie coins of a different currency, or non-genuine coins or "slugs").

Coin validators typically measure one or more characteristics of a coin deposited in the machine using one or more existing measurement techniques. These techniques may include, for example, measuring:

(i) characteristics of sound signals generated after the coin strikes a surface; or (ii) characteristics of electrical signals generated as the coin passes through an electromagnetic field.

Once data measured in connection with the deposited coin is recorded, various differing comparison methods are used to compare the measured data with reference data derived from similar measurements made in relation to a number of genuine "reference" coins of a particular currency. A subsequent validation process attempts to match the measured values of a deposited coin with the reference measurements of the reference coin denominations of the currency.

Developing validation processes has been the subject of some activity. Most attempts have involved relatively sophisticated data manipulation processes. For example, there are a number of published international patent applications in the name of Mars Incorporated (WO 92/07339, WO 92/18951 and WO 94/12951) that use relatively involved data manipulation methods to improve the results of the coin validation process.

In the first of the two abovementioned references, an n-dimensional space is defined by dimensions corresponding with particular measured characteristics of the deposited coin.

In WO 92/18951, for example, a number of regular n-dimensional ellipses in n-dimensional space are representative of respective coin denominations. It is determined whether the measured characteristics of a deposited coin correspond with a point within one of the n-dimensional ellipses, hence indicating that the deposited coin is of a denomination corresponding with that particular ellipse.

In the system disclosed in WO 92/18951, the centre of each n-dimensional ellipse represents the statistical mean of the measured characteristics of the respective reference coin denominations, and the length of each major axis is indicative of the standard deviation of the characteristics corresponding with these respective dimensions. The acceptance limits of the n-dimensional ellipse (and thus its is volume) can be adjusted as required by varying the length of each axis of the ellipse. This flexibility is intended to improve the results of the validation process, in view of other coins which generate similar measured characteristics to those of the genuine reference coins.

In WO 92/18951, an arbitrary n-dimensional volume is assumed, rather than a regular n-dimensional ellipse. It is also recognised that non-genuine coins can also be attributed arbitrary n-dimensional volumes representative which attempt to replicate the measured characteristics of genuine coins. It is recognised in WO 92/18951 that, for a particular denomination, the n-dimensional volume of a genuine coin may coincide with that of a non-genuine coin.

It is stated that one approach to this problem is to tighten the tolerance values for acceptance as a genuine coin (ie shrinking the n-dimensional acceptance volume representative of that coin), though this may lead to genuine coins being incorrectly rejected. Instead, this reference proposes a process whereby the n-dimensional acceptance volume for a coin denomination is adjusted by removing the overlap with a non-genuine coin if the frequency of occurrence of measured characteristics for genuine coins in that volume is sufficiently low. To increase the simplicity of comparison of measured data with reference data for a given coin denomination (amongst other reasons), it is disclosed that the measured data is normalised by linear translation to the centre of the n-dimensional acceptance volume. In effect, the mean of the n-dimensional data values representing the measured characteristics of a coin is simply removed from each dimension. Once the data is normalised in this way a comparison operation is performed using conventional techniques It is an object of the invention to attempt to provide a data manipulation method that can be applied to coin validation to achieve enhanced coin discrimination.

SUMMARY OF THE INVENTION

The inventive concept resides in a recognition that coin validation can be advantageously improved by transforming data values from a first geometric space to a second geometric space, in which the transformed values in the second geometric space are preferably better adapted for discrimination between different coin denominations than corresponding values in the first geometric space.

While transformation between different geometric spaces is a technique that is used in various arts, these techniques have not previously been used or proposed in connection with coin validation. Various attempts have previously been made to improve the results of coin validation processes by using relatively complicated data manipulation processes in a first geometric space. However, the present applicant has recognised that the results of coin validation can be improved by taking a quite different approach which involves transforming data in a first geometric space to an appropriate second geometric space.

Accordingly, the invention provides a method of manipulating data in relation to coin validation, the method including: transforming one or more first multivariate data values in a first geometric space to one or more respective second multivariate data values in a second geometric space, said first multivariate data values corresponding with data variables related to one or more coins; wherein at least one of the basis vectors of the dimensions of said second geometric space is different from any one of the basis vectors of the dimensions of said first geometric space.

Preferably, said second multivariate data values in said second geometric space are generally less correlated than said first multivariate data values in said first geometric space.

Preferably, said second multivariate data values in said second geometric space are generally uncorrelated.

Preferably, the basis vectors of the dimensions of said second geometric space are determined with the assistance of principal component analysis on the basis of said first multivariate data values in said first geometric space.

Preferably, the number of dimensions of said second geometric space is equal to or lower than the number of dimensions of said first geometric space. Preferably, said first geometric space has three dimensions, and said second geometric space has two dimensions.

Preferably, the method further includes: establishing one or more predetermined multivariate sets of said second multivariate data values in said second geometric space, wherein said predetermined multivariate data sets can be used to assess whether a coin is of a coin denomination respectively corresponding with one of said one or more predetermined multivariate sets.

Preferably, at least one of said one or more predetermined multivariate sets are determined from average values of a plurality of said first multivariate data values, after said transformation from said first geometric space to said second geometric space.

Preferably, the method further includes: sampling variables associated with one or more coins to derive said first multivariate data values.

Preferably, the method further includes: comparing one of said second multivariate data values in said second geometric space with one or more predetermined multivariate sets in said second geometric space.

Preferably, the method further includes assessing, on the basis of said comparison of said one or more second multivariate data values with said predetermined multivariate data sets, whether said one or more second multivariate data values correspond with one of said predetermined multivariate sets and hence a respective coin denomination.

Preferably, said comparison is performed for a plurality of said second multivariate data values in respective said second geometric spaces, and each of said second geometric spaces is different from each other.

The invention also includes a method of manipulating data in relation to coin validation, the method including:

- sampling variables associated with one or more coins to derive said first multivariate data values.
- transforming one or more first multivariate data values in a first geometric space to one or more respective second multivariate data values in a second geometric space, said first multivariate data values corresponding with one or more sets of data variables related to one or more coins;
- establishing one or more predetermined multivariate sets of said second multivariate data values in said second geometric space, wherein each of said one or more predetermined multivariate sets can be used to determine whether any of said one or more second multivariate data values correspond with respective coin denominations;
- wherein at least one of the dimensions of said second geometric space is different from any one of the dimensions of said first geometric space.

The invention further includes a method of manipulating data in relation to coin validation, the method including:

- sampling variables associated with one or more coins to derive one or more said first multivariate data values in a first geometric space;
- transforming said one or more first multivariate data values in a first geometric space to one or more respective second multivariate data values in a second geometric space, said first multivariate data values corresponding with data variables related to one or more coins;
- comparing one of said second multivariate data values in said second geometric space with one or more predetermined multivariate sets in said second geometric space, wherein each of said one or more predetermined multivariate sets correspond with respective coin denominations;
- assessing, on the basis of said comparison of said one or more second multivariate data values with said predetermined multivariate data sets, whether said one or more second multivariate data values correspond with one of said predetermined multivariate sets and hence said respective coin denominations;
- wherein at least one of the basis vectors of the dimensions of said second geometric space is different from any one of the basis vectors of the dimensions of said first geometric space.

DESCRIPTION OF EMBODIMENTS

Embodiments of the invention are used in conjunction with coin validators which operate by sensing characteristics of coins deposited in the mechanism of the coin validator. One particular type of electromagnetic coin validator, and its operation is described in further detail in the applicant's published international patent application no WO 95/16978, the contents of which are herein incorporated by reference.

As coins are passed through a sensor of the type referred to above, each coin generates a signal pulse having a waveform which can be closely approximated by a damped sinusoid having a characteristic amplitude A, a decay constant and a frequency ω. This signal pulse is described by the expression directly below.

$$U=Ae^{\sigma 1}\sin(\omega t)$$

The "area" bounded by particular lobes of this signal and the line U=0 can be determined from the analytic expression directly below.

$$I=-A\frac{e^{-\sigma t}}{\omega^2+\sigma^2}(\sigma\sin(\omega t)+\omega\cos(\omega t))+C$$

Practically, this can be determined by either of two methods. Circuitry incorporating integrators or peak followers can be used to determine the area under the curve. The area under the first negative lobe is proportional to an analytic expression as set out directly below.

$$II=-\frac{1}{\omega\left(1+\left(\frac{\sigma}{\omega}\right)^2\right)}\left(e^{-\sigma T}+e^{-\frac{\sigma T}{2}}\right)$$

Alternatively, the value of successive peaks can be tracked by a peak follower so that the area can be determined in accordance with the expression directly below.

$$l = -\frac{1}{\omega\left(1 + \left(\frac{\ln\frac{p_1}{p_2}}{2\pi}\right)^2\right)}\left(\frac{p_2}{p_1} + \sqrt{\frac{p_2}{p_1}}\right)$$

From a determination of area under the curve, with both period and damping constant, gradients of area against period and damping can be calculated. The damping and period correspond with the effective resistance and inductance respectively.

The sensor itself contributes inherently to the measured effective resistance and inductance. Also, this contribution is different when coins of different denominations are passed through the sensor (that is, there is an amount of non-linearity in the sensor's results).

When the frequency of oscillation is small, there is very little change in damping, as expected. This changes above about 1000 Hz. At higher frequencies, eddy currents (proportional to the square of the waveform frequency) contribute to the measured damping. The damping determined by the sensor will be influenced not only by the coins, but also by losses inherent to the sensor.

Figure 1:
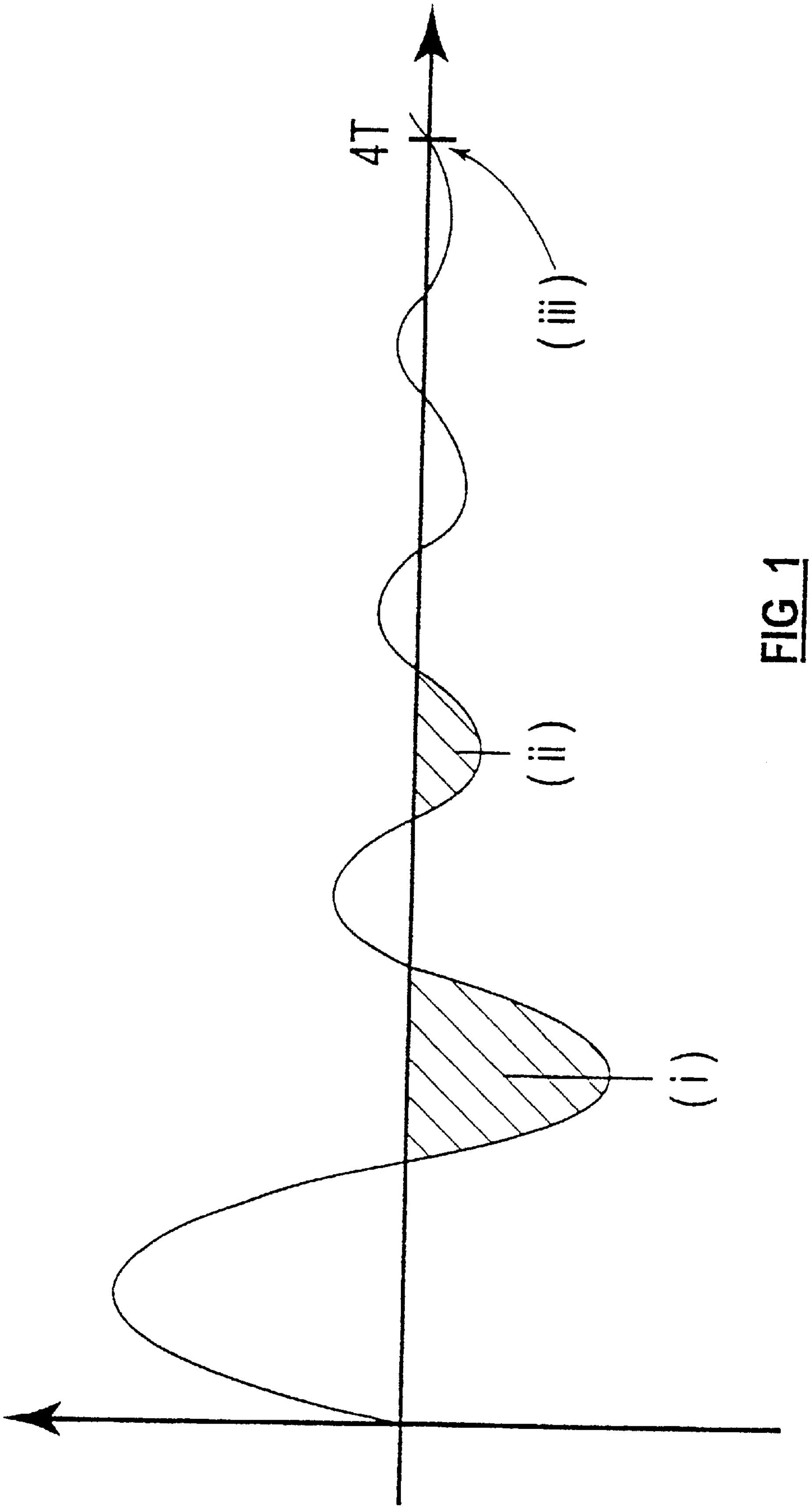
FIG. 1 is a graph representing a pulse signal waveform generated when a coin is passed through a sensor of a coin validator.

As an example, the sensor circuitry captures three samples of the damped sinusoidal waveform represented in FIG. 1. The three measured variables may be:

(i) the negative area under the second lobe of the pulse signal;

(ii) the negative area under the fourth lobe of the pulse signal; and (iii) the duration of the pulse signal over four periods.

These variables are indicated in FIG. 1 by corresponding reference numerals (i), (ii) and (iii). Of course, various other coin characteristics can be measured, using a sensor of the type referred to above or another type of appropriate sensor arrangement.

Figure 2:
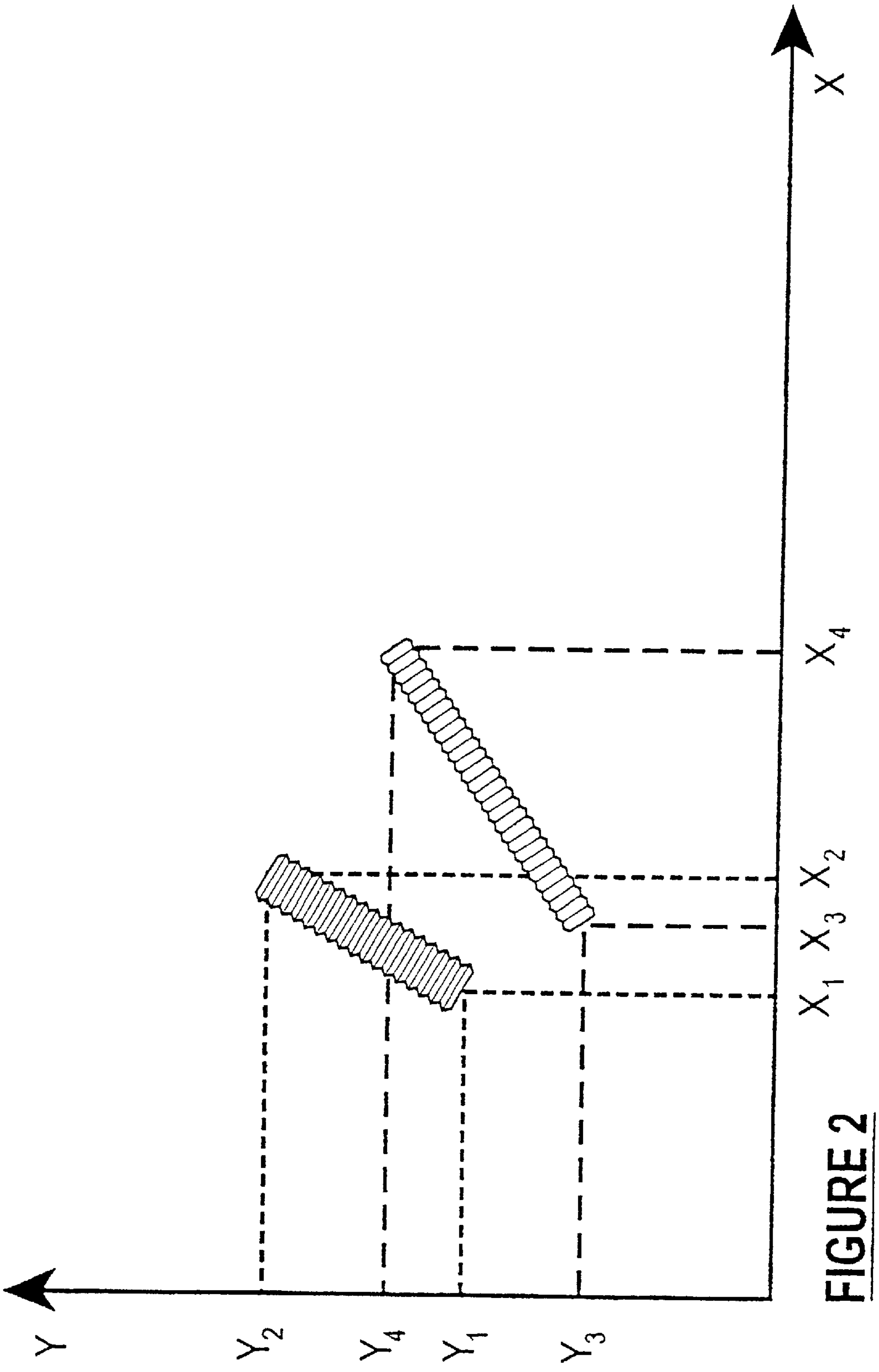
FIG. 2 is a graph of data values forming respective data sets in a first geometric space, in accordance with an embodiment of the invention, when represented in two dimensions.

FIG. 2 represents, in two dimensions, two different sets of measured coin variables for two different coins. The data is scattered due to noise which is invariably introduced into the measurement process due to limitations in the sensor assembly, systematic non-linearities of construction or operation, and a range of random influences in the way coins are passed through the sensor.

In FIG. 2, (X, Y,) and ($X_2$, $Y_2$) represent the coordinates of endpoints of one of the data sets towards the upper left of FIG. 2. Similarly, coordinates ($X_3$, $Y_2$) and ($X_4$, $Y_4$) represent the endpoint of the data set at the lower right of FIG. 2. From FIG. 2, it can be seen that $X,<X_3<X_2<X$ and $Y_3<Y_1<Y_4>Y_2$. As is evident, the values in the two respective data sets overlap each other in both the "X" and "Y" dimensions. This overlap results in difficulties in determining with which of the data sets (and hence coin denomination) given data values in the first geometric space correspond.

Figure 3:
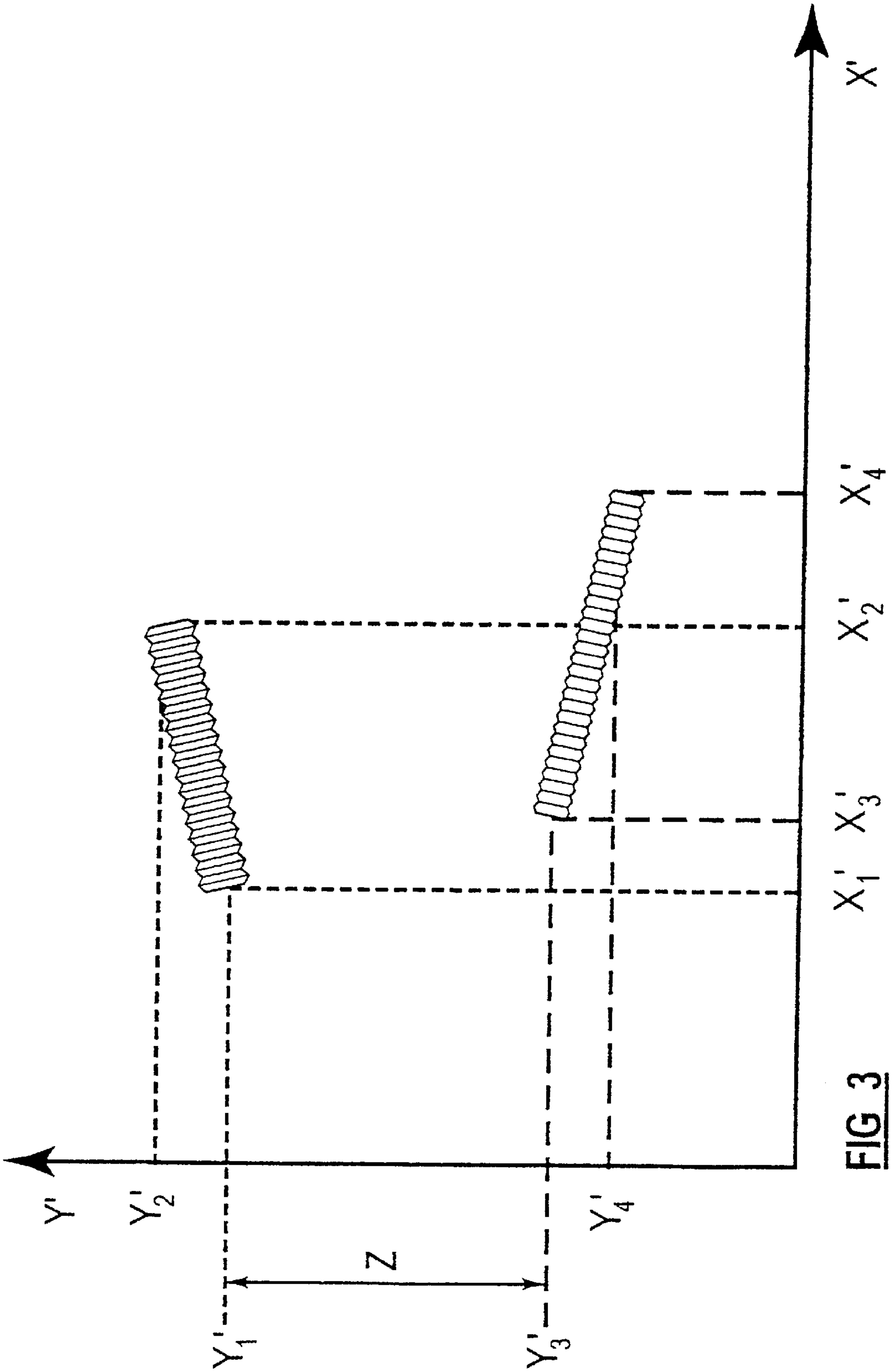
FIG. 3 is a graph of corresponding data values forming respective data sets in a second geometric space, in accordance with an embodiment of the invention.

The measured data, or first multivariate data values, of a first geometric space are transformed to corresponding second multivariate data values in a second geometric space, in which at least one of the basis vectors of the dimensions of the second geometric space is different from any of the basis vectors of the dimensions of the first geometric space. For the sake of brevity, it is said that at least one of the dimensions of the second geometric space is different from any one of the dimensions of the first geometric space. Transformation from a first geometric space to a second geometric space can provide for a more favourable basis for comparison, as described in further detail below. FIG. 3 represents, in two dimensions, corresponding data sets of those represented in FIG. 2, after transformation from a first geometric space to a second more suitable geometric space.

In FIG. 3, it is clearly seen that $Y_4'<Y_3'<Y_1'<Y_2'$ The "Clearance between $Y_3'$ and $Y_1'$ (the closest points in Y' between the respective predetermined multivariate data sets) is marked "Z". In the second geometric space, two predetermined multivariate data sets indicated in FIG. 3 are more clearly separated. The clearance "Z" allows measured data values in the second geometric space to be more clearly distinguished as corresponding with one or other of the predetermine multivariate sets and hence a corresponding coin denomination.

Principal component analysis (PCA) is a mathematical technique that can be used as a basis for developing a method of transforming data from a first geometric space to a second geometric space, in which the new second geometrical space has a set of orthogonal axes. Preferably, principal component analysis is used to determine the dimensions of the second geometric space. This is done using eigenvector/eigenvalue equations, thus allowing orthogonality to be achieved. The dimensions of the first geometric space are ranked in order of descending variance by the eigenvalues of the first geometric space.

Thus, principal component analysis has the advantage that it can assist in identifying the dimensions that will cause minimal correlation of the measured multivariate data in the second geometric space, thus providing a more favorable way in which to distinguish coins of different denominations.

The process of performing principal component analysis is now described. A large number N of samples are taken for each variable associated with the coin variable space. These averages are "counts":

$$C1_{avg}=\Sigma_i C1_i/N$$

$$C2_{avg}=\Sigma_i C2_i/N$$

$$C3_{avg}=\Sigma_i C3_i/N$$

where i=1 . . . N

Once the averages for each variable are known, a matrix M consisting of columns (corresponding with each coin variable) listing the difference of each sample with the average can be written. Thus, a square matrix V of dimension equal to the number of coin variables can be calculated by multiplying by using the following expressions.

$$C1_{di}=C1_i-C1_{avg}$$

$$C2_{di}=C2_i-C2_{avg}$$

$$C3_{di}=C3_i-C3_{avg}$$

$$p_i=\langle C1_{di}\ C2_{di}\ C3_{di}\rangle$$

$$M = \begin{bmatrix} Cd_{11} & Cd_{12} & Cd_{13} \\ Cd_{21} & Cd_{22} & Cd_{23} \\ Cd_{31} & & \\ \vdots & \vdots & \vdots \\ Cd_{N1} & Cd_{N2} & Cd_{N3} \end{bmatrix}$$

This matrix is transposed:

$$M^T = \begin{bmatrix} Cd_{11} & Cd_{21} & Cd_{31} & Cd_{N1} \\ Cd_{21} & Cd_{22} & & Cd_{N2} \\ Cd_{31} & Cd_{32} & & Cd_{N3} \end{bmatrix}$$

And the product formed to obtain a variance matrix V:

$$V = M^T M = \begin{bmatrix} V_{11} & V_{12} & V_{13} \\ V_{21} & V_{22} & V_{23} \\ V_{31} & V_{32} & V_{33} \end{bmatrix}$$

Variances are on the main diagonal eg:

$$V_{11} = \left(\sum_i Cd_{1i}^2\right) \Big/ N - 1 \text{ where } i = 1 \ldots N$$

Respective covariances are given by off-diagonal elements. For example:

$$V_{12} = \sum_i (Cd_{1i})(Cd_{2i}) / N - 1$$

$$V_{12} = [\Sigma(Cd_{1i})(Cd_{2i})]/(N-1)$$

Eigenvalues are determined from the equation:

$$V R_k = \lambda_k R_k \text{ (k=1,2,3 in our case)}$$

Thus we write:

$$V R_k - \lambda_k R_k = 0 \Rightarrow (V - \lambda_k I) R_k =$$

$$0 \Rightarrow det(V - \lambda_k I) = 0 \Rightarrow det(V - \lambda_k I) = \begin{matrix} V_{11} - \lambda & V_{12} & V_{13} \\ V_{21} & V_{22} - \lambda & V_{23} \\ V_{31} & V_{32} & V_{33} - \lambda \end{matrix} \Rightarrow$$

$$(V_{11} - \lambda)[(V_{22} - \lambda)(V_{33} - \lambda) - V_{23}V_{32}] - V_{12}[V_{21}(V_{33} - \lambda) - V_{23}V_{31}] + V_{13}[V_{21}V_{32} - (V_{22} - \lambda)V_{31}] = 0$$

The eigenvectors and associated eigenvalues of V are calculated in the usual way. For three coin variables, the resulting equation is a cubic polynomial that can be solved, for example, by Gaussian elimination or alternative methods. The eigenvectors are then calculated by substituting the eigenvalues so obtained into the equation below:

$$(V - \lambda_k I) R_k = 0$$

The largest eigenvalue corresponds with the first principal direction (given by the associated eigenvector), with subsequent principal directions indicated similarly. When a principal component analysis is done for various coins across three coin variables, it is found that two coin variables primarily contribute to the behaviour of the sensor assembly.

When coins are measured in relation to three variables, an assessment of whether a particular coin is part of a coin set is made on the basis of the three variances and co-variances. However, as we have determined that only two variables are of primary significance, this assessment can be based on these two variables only. A new two-dimensional Euclidean space can be chosen so that it is possible to fit as many possible coin sets into the dynamic range of the sensor assembly.

Accordingly, there are various new Euclidean spaces which can be chosen instead of only using principal component analysis to identify dimensions of a second geometric space for the measured multivariate data, other techniques can also be used as required. These spaces may include dimensions which are, for example:

average resistivity direction average of Cu and Ni area change vector resistivity direction of particular coin average of principal components of the coin set averages of the "high" and "low" level members of the set The discrimination/validation process can thus be described as involving the following steps:

Collecting data in original three dimensional space.

Transforming data into the chosen two dimensional space.

Comparing transformed data with predetermined limits, obtained from the reference sets.

Validation can be performed not only in one space but in a number of spaces, as required. Whether a comparison is conducted across multiple spaces depends on the required speed and accuracy of the results, and how much computing power, and memory is available.

Some of the spaces described above have the advantage of simplicity, and may be suitable for all sets. An example is the space defined by the average resistivity direction, and the average area direction space. Other spaces can require more memory to calculate, such as the space defined by the principal component for each coin set, and the high-low set members, or the resistivity direction.

It is now necessary to determine set directions, so this information can be combined with the principal direction vectors to transform between spaces. To this end, it is desirable to calculate a direction vector which describes the behaviour of a "real" coin collection consisting of various denominations and is thus of relatively general application.

A large number of signatures (multivariate data values) are obtained from the same disc. Another set of signatures is obtained from a number of different discs of the same denomination. In the first case, differences in measured values arise due to the lack of repeatability of a given coin path through the sensor, the limitations of resolution of the sensor, and sensor noise. In the second case differences arise, through variations in minting (alloy, size etc) and subsequent handling.

Outlying data is rejected. In this case, data which deviates more than three standard deviations from average is rejected. The average used is the average of data derived from each coin.

Once anomalous data (outside three standard deviations) is taken out of the sample set, the average and then standard deviation is recalculated and a similar rejection, if necessary, is made of data which lies outside the readjusted boundaries. This is repeated until all data lies within three standard deviations and the average of that data.

$$SDc_1 = \sqrt{[\Sigma(C1_i - C1_{avg})^2/N]}$$

$$SDc_2 = \sqrt{[\Sigma(C2_i - C2_{avg})^2/N]}$$

$$SDc_3 = \sqrt{[\Sigma(C3_i - C3_{avg})^2/N]}$$

where i=1 . . . N and $C1_{avg}$ is calculated earlier

Average data for two "real" coins A and B of the same denomination is defined as follows:

$$CA1_{avg}=\Sigma CA1_i/N$$

$$CA2_{avg}=\Sigma CA2_i/N$$

$$CA3_{avg}=\Sigma CA3_i/N$$

$$CB1_{avg}=\Sigma CB1_i/N$$

$$CB2_{avg}=\Sigma CB2_i/N$$

$$CB3_{avg}=\Sigma CB3_i/N$$

where i=1 . . . N (N is adjusted in each case as described above)

Coin direction Q is taken as the difference between these averages as follows:

$$Q=<CA-CB>$$

where $CA=<CA1_{avg}\ CA2_{avg}\ CA3_{avg}>$ and $CB=<CB1_{avg}\ CB2_{avg}\ CB3_{avg}>$ The elements of Q are as follows:

$$q1=CA1_{avg}-CB1_{avg}$$

$$q2=CA2_{avg}-CB2_{avg}$$

$$q3=CA3_{avg}-CB3_{avg}$$

Accordingly it is possible to find a coin directional unit vector $Q_u$:

$$Q_U=Q/|Q|$$

where $|Q|=\sqrt{(q1^2+q2^2+q3^2)}$

By assuming that all data for Q is within three standard deviations of average, the standard deviation in Qu can be calculated as Q/6.

As the original space is three dimensional then each data set can be described by the vector:

$$p=<C_1\ C_2\ C_3>$$

Variables $C_1$, $C_2$ and $C_3$ are "counts" variables.

The new two dimensional space into which the data is transformed can be described by the vector:

$$p_t=<c_{t1}\ c_{t2}>$$

Matrix T is used to transform the data from the three dimensional space to the two dimensional space and accordingly has 2 rows and 3 columns. It satisfies the equation:

$$p_t=Tp$$

Axes v and c of the new space are chosen from the possible choices noted above,

An addition axis w perpendicular to vectors v and c is formed from the vector cross product of v and c:

$$w=v\times c$$

In this case, p can be expressed in terms of unit vectors $v_u$, $c_u$ and $w_u$:

$$p=c_{t1}(v_u)+c_{t2}(c_u)+c_{t3}(w_u)$$

Matrix T is calculated from the dot product of p and unit vectors vu and cu as follows:

$$p.v_u=c_{t1}(v_u.v_u)+c_{t2}(c_u.v_u) \quad \text{Equation 1}$$

$$p.c_u=c_{t1}(v_u.c_u)+c_{t2}(c_u.c_u) \quad 2$$

Terms containing wu are zero due to the orthogonality of w with v and c.

Now we have to solve these equations for unknown values $T_1$ and $T_2$. This may be performed by multiplying equation 1 with $c_u$ .$c_u$ and multiplying Equation 2 by $C_u$ .$v_u$, followed by subtraction of Equation 2 from Equation 1. Accordingly:

$$(p.v_u)(c_u.c_u)-(p.c_u)(c_u.v_u)=c_{t1}((v_u.v_u)(c_u.c_u)-(v_u.c_u)_2) \quad \text{Equation 3}$$

Because $c_u$ and $v_u$ are unit vectors we have respective dot products:

$$c_u.c_u=1 \text{ and } v_u.v_u=1$$

By placing this into Equation 3 we finally obtain:

$$c_{t1}=(p.v_u-(p.c_u)(c_u.v_u))/(1-(v_u.c_u)^2)$$

Similar equation holds for $c_{t2}$:

$$c_{t2}=(p.c_u-(p.v_u)(c_u.v_u))/(1-(v_u.c_u)^2)$$

Taking out vector p we obtain:

$$c_{t1}=p.(v_u-c_u(c_u.v_u))/(1-(v_u.c_u)^2)$$

$$c_{t2}=p.(c_u-v_u(c_u.v_u))/(1-(v_u.c_u)_2)$$

Therefore first row of the transformation matrix T is $T_1=<t_{11}\ t_{12}\ t_{13}>$ and is given as:

$$T_1=(v_u-c_u(c_u.v_u))/(1-(v_u.c_u)^2)$$

Second row of T is $T_2=<t_{21}\ t_{22}\ t_{23}>$ and is:

$$T_2=(c_u-v_u(c_u.v_u))/(1-(v_u.c_u)^2)$$

Thus we have obtained matrix T which enables us to transform data from the original space into any space defined by two vectors. This analysis is not limited to transformations from three dimensional into two dimensional spaces. Similar transformations may be devised in general from "m" dimensional spaces into "n" dimensional space.

Now the implementation of the transformation method for the coin validator is described. It can be performed on a personal computer coupled to the sensor hardware, or calculated in a microprocessor directly interfacing with the hardware.

Validator parameters are determined by the following method:

Recording "Q count" (data with no coin in the sensor assembly): $Q=<q_1,q_2,q_3>$ Recording data corresponding to resistor $R_{cal}$: $R_c=<rc_1, rc_2,rc_3>$ Recording data corresponding to Ni reference disk: $Nc=<nc_1,nc_2,nc_3>$ Recording data corresponding to Cu reference disk: $Cc=<cc_1,cc_2,cc_3>$ After these steps are performed, the validator's calculations are automatic as described below.

Transformation factor is calculated by the following steps:

Finding the unit vector direction of change between the vector associated with the Cu reference disc and the "Q" count using:

$$\Delta Cu_1 = q_1 - cc_1$$

$$\Delta Cu_2 = q_2 - cc_2$$

$$\Delta Cu_3 = q_3 - cc_3$$

$$\|Cu\| = \sqrt{\Delta Cu_1^2 + \Delta Cu_2^2 + \Delta Cu_3^2}$$

$$UCu = \left\langle \frac{\Delta Cu_1}{\|Cu\|} \; \frac{\Delta Cu_2}{\|Cu\|} \; \frac{\Delta Cu_3}{\|Cu\|} \right\rangle$$

Finding the unit vector direction of change between the Ni reference disc and the "Q" count using:

$$\Delta Ni_1 = q_1 - nc_1$$

$$\Delta Ni_2 = q_2 - nc_2$$

$$\Delta Ni_3 = q_3 - nc_3$$

$$\|Ni\| = \sqrt{\Delta Ni_1^2 + \Delta Ni_2^2 + \Delta Ni_3^2}$$

$$UNi = \left\langle \frac{\Delta Ni_1}{\|Ni\|} \; \frac{\Delta Ni_2}{\|Ni\|} \; \frac{\Delta Ni_3}{\|Ni\|} \right\rangle$$

Finding the average value of thee two unit vectors.

$$AvgA = \left(\frac{UNi + UCu}{2}\right) = \left\langle \frac{uni_2 + ucu_1}{2} \; \frac{uni_1 + ucu_2}{2} \; \frac{uni_3 + ucu_3}{2} \right\rangle$$

$$\|A\| = \sqrt{avga_1^2 + avga_2^2 + avga_3^2}$$

$$UAvgA = \left\langle \frac{avga_1}{\|A\|} \; \frac{avga_2}{\|A\|} \; \frac{avga_3}{\|A\|} \right\rangle$$

Finding the unit vector change for "resistivity" direction between Ni and Cu reference discs, using:

$$\Delta R_1 = Ni_1 - Cu_1$$

$$\Delta R_2 = Ni_2 - Cu_2$$

$$\Delta R_3 = Ni_3 - Cu_3$$

$$\|R\| = \sqrt{\Delta R_1^2 + \Delta R_2^2 + \Delta R_3^2}$$

$$UR = \left\langle \frac{\Delta R_1}{\|R\|} \; \frac{\Delta R_2}{\|R\|} \; \frac{\Delta R_3}{\|R\|} \right\rangle$$

Defining the dot product of area change vector (AvgA) and resistivity change vector (UR):

$$AR = \mathrm{Avg}A.UR = \mathrm{avg}a_1 \cdot ur_1 + \mathrm{avg}a_2 \cdot ur_2 + \mathrm{avg}a_3 \cdot ur_3$$

Defining the transformation matrix of two rows by three values as:

$$\mathrm{row}_1 = (U\mathrm{Avg}A - (AR*UR))/(1 - AR^2) = \langle a_{11} \; a_{12} \; a_{13} \rangle$$

$$\mathrm{row}_2 = (UR - (AR*U\mathrm{Avg}A))/(1 - AR_2) = \langle a_{21} \; a_{22} \; a_{23} \rangle$$

Elements $a_{11}$ . . . are obtained following vector manipulations rules, for example:

$$a_{11} = (u\mathrm{avg}a_1 - AR*ur_1)/(1 - AR^2)$$

$$a_{12} = (u\mathrm{avg}a_2 - AR*ur_2)/(1 - AR^2)$$

The validator uses transformation coefficients for multiplication of the collected data "counts".

If the collected data counts (during validation process) are $C = \langle c_1 \; c_2 \; c_3 \rangle$ then transformed value is:

$$C_T = C*T\,R = \langle (a_{11}*c_1 + a_{12}*c_2 + a_{13}*c_3)(a_{21}*c_1 + a_{22}*c_2 + a_{23}*c_3) \rangle$$

These transformed values can be used for the creation of two dimensional "acceptance windows" in the second geometric space, or the derivation any other suitable acceptance criteria or test that can be used as the basis for validating measured values relating to coins. Of course, many other forms of acceptance criteria may be used.

As described above, dimensions of the second geometric space can be chosen so that multivariate data measured in the first geometric space in relation to a deposited coin can be transformed from that first geometric space to the second geometric space. At least one of the dimensions or basis vectors of the second geometric space is different from any of those of the first geometric space.

The transformation from the first geometric space to the second geometric space is performed to allow measured multivariate values to be more readily and reliably distinguished as being indicative of different coin denominations. Preferably, this assessment is made on the basis of whether the measured multivariate values, in the second geometric space, fall within one of a number of predetermined multivariate data sets of second multivariate data values, in the second geometric space.

Each of these predetermined multivariate sets correspond with a respective coin denomination. Preferably, in the second geometric space, the second multivariate data values in the predetermined multivariate sets are relatively uncorrelated in most cases.

First multivariate data values are preferably three dimensional, and are transformed using a suitable matrix to second multivariate data values, which are preferably two dimensional. The dimensions of the second geometric space are preferably the principal components of the first multivariate data values that are of primary significance. It is preferred that a suitable matrix is established, with the assistance of principal component analysis, which is generally suitable for coins of all denominations and currencies when used in conjunction with a particular sensor arrangement. However, it is also recognised that, due to non-linearities, differences in coin compositions between currencies, or particular fraud issues that may exist in certain countries, it may be desirable to refine or "fine tune" individual matrix values of this transformation matrix to improve the results of the coin validation process.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A method of manipulating data in relation to coin validation, the method including:

transforming one or more first multivariate data values in a first geometric space to one or more respective second multivariate data values in a second geometric space, said first multivariate data values corresponding with data variables related to one or more coins;

wherein at least one of the basis vectors of the dimensions of said second geometric space is different from any one of the basis vectors of the dimensions of said first geometric space; and wherein said second multivariate data values in said second geometric space are generally less correlated than said first multivariate data values in said first geometric space.

2. A method as claimed in claim 1, wherein said second multivariate data values in said second geometric space are generally uncorrelated.

3. A method as claimed in any one of claims 1 to 2, wherein the basis vectors of the dimensions of said second geometric space are determined with the assistance of principal component analysis on the basis of said first multivariate data values in said first geometric space.

4. A method as claimed in claim 1, wherein the number of the dimensions of said second geometric space is equal to or lower than the number of the dimensions of said first geometric space.

5. A method as claimed in claim 1, wherein said first geometric space has three dimensions, and said second geometric space has two dimensions.

6. A method as claimed in claim 1, further including: establishing one or more predetermined multivariate sets of said second multivariate data values in said second geometric space, wherein said predetermined multivariate data sets can be used to assess whether a coin is of a coin denomination respectively corresponding with one of said one or more predetermined multivariate sets.

7. A method as claimed in claim 6, wherein at least one of said one or more predetermined multivariate sets arm determined from average values of a plurality of said first multivariate data values, after said transformation from said first geometric space to said second geometric space.

8. A method as claimed in claim 1, further including:

sampling variables associated with one or more coins to derive said first multivariate data values.

9. A method as claimed in claim 1, further including:

comparing one of said second multivariate data values in said second geometric space with one or more predetermined multivariate sets in said second geometric space.

10. A method as claimed in claim 9, further including assessing, on the basis of said comparison of said one or more second multivariate data values with said predetermined multivariate data sets, whether said one or more second multivariate data values correspond with one of said predetermined multivariate sets and hence a respective coin denomination.

11. A method as claimed in claim 1, wherein said comparison is performed for a plurality of said second multivariate data values in respective said second geometric spaces, and each of said second geometric spaces is different from each other.

12. A method of manipulating data in relation to coin validation, the method including:

sampling variables associated with one or more coins to derive one or more first multivariate data values in a first geometric space;

transforming one or more first multivariate data values in a first geometric space to one or more respective second multivariate data values in a second geometric space, said first multivariate data values corresponding with data variables related to one or more coins;

determining one or more predetermined multivariate sets of said second multivariate data values in said second geometric space, wherein each of said one or more predetermined multivariate sets can be used to determine whether any of said one or more second multivariate data values correspond with respective coin denominations;

wherein at least one of the basis vectors of the dimensions of said second geometric space is different from any one of the basis vectors of the dimensions of said first geometric space; and wherein said second multivariate data values in said second geometric space are generally less correlated than said first multivariate data values in said first geometric space.

13. A method of manipulating data in relation to validation, the method including:

sampling variables associated with one or more coins to derive one or more first multivariate data values in a first geometric space;

transforming said one or more first multivariate data values in said first geometric space to one or more respective second multivariate data values in a second geometric space, said first multivariate data values corresponding with data variables related to one or more coins;

comparing one of said second multivariate data values in said second geometric space with one or more predetermined multivariate sets in said second geometric space, wherein each of said one or more predetermined multivariate sets correspond with respective coin denominations;

assessing, on the basis of said comparison of said one or more second multivariate data values with said predetermined multivariate data sets, whether said one or more second multivariate data values correspond with one of said predetermined multivariate sets and hence said respective coin denominations;

wherein at least one of the basis vectors of the dimensions of said second geometric space is different from any one of the basis vectors of the dimensions of said first geometric space; and wherein said second multivariate data values in said second geometric space are generally less correlated than said first multivariate data values in said first geometric space.

* * * * *